(12) United States Patent
Oh et al.

(10) Patent No.: US 9,209,923 B2
(45) Date of Patent: Dec. 8, 2015

(54) METHOD AND APPARATUS FOR TRANSMITTING OF OFDM SIGNAL

(71) Applicant: ELECTRONICS AND TELECOMMUNICATIONS RESEARCH INSTITUTE, Daejeon (KR)

(72) Inventors: Jung-yeol Oh, Daejeon (KR); Young Ha Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/534,874

(22) Filed: Nov. 6, 2014

(65) Prior Publication Data

US 2015/0139357 A1    May 21, 2015

(30) Foreign Application Priority Data

Nov. 6, 2013  (KR) .......................... 10-2013-0134206
Nov. 6, 2014  (KR) .......................... 10-2014-0153879

(51) Int. Cl.
*H04L 27/28*      (2006.01)
*H04J 11/00*      (2006.01)
*H04L 27/26*      (2006.01)
*H04L 5/00*       (2006.01)

(52) U.S. Cl.
CPC ........... *H04J 11/0023* (2013.01); *H04L 5/0007* (2013.01); *H04L 27/2636* (2013.01)

(58) Field of Classification Search
CPC .............. H04L 5/0007; H04L 27/2636; H04L 2025/03414; H04W 72/00; H04W 72/0453
USPC ......................................................... 375/260
See application file for complete search history.

(56) References Cited

U.S. PATENT DOCUMENTS

| | | | |
|---|---|---|---|
| 2007/0263738 A1* | 11/2007 | Jitsukawa et al. | 375/260 |
| 2009/0097447 A1* | 4/2009 | Han et al. | 370/330 |
| 2009/0231990 A1 | 9/2009 | Lee et al. | |
| 2010/0008432 A1 | 1/2010 | Kim et al. | |
| 2011/0038346 A1* | 2/2011 | Yokomokora et al. | 370/330 |
| 2011/0128942 A1* | 6/2011 | Kim et al. | 370/336 |
| 2011/0135016 A1 | 6/2011 | Ahn et al. | |
| 2013/0308657 A1 | 11/2013 | Lee et al. | |

FOREIGN PATENT DOCUMENTS

| | | |
|---|---|---|
| KR | 10-2008-0050221 A | 6/2008 |
| KR | 10-2011-0036929 A | 4/2011 |
| KR | 10-2012-0122741 A | 11/2012 |
| WO | WO 2009/135886 A1 | 11/2009 |

* cited by examiner

*Primary Examiner* — Don N Vo
(74) *Attorney, Agent, or Firm* — NSIP Law

(57) ABSTRACT

Provided is a transmitting apparatus including: a controller configured to determine a size of subchannels and a number of subchannels based on a size of entire channel band; and a DFT processor configured to spread a data symbol based on the number of the subchannels and the size of the subchannels.

20 Claims, 12 Drawing Sheets

METHOD AND APPARATUS FOR TRANSMITTING OF OFDM SIGNAL

CROSS-REFERENCE TO RELATED APPLICATION

This application claims priority to and the benefit of Korean Patent Application Nos. 10-2013-0134206 and 10-2014-0153879 filed in the Korean Intellectual Property Office on Nov. 6, 2013 and Nov. 6, 2014, the entire contents of which are incorporated herein by reference.

BACKGROUND OF THE INVENTION (a) Field of the Invention

The present invention relates to a method and an apparatus for transmitting an OFDM signal by applying a discrete Fourier transform-spread.

(b) Description of the Related Art

A discrete Fourier transform-spread orthogonal frequency-division multiplexing (DFT-spread OFDM) (hereinafter, referred to as "DFTS-OFDM") modulation scheme has been utilized as a main standard technology of a communication system requiring a low power characteristic in that efficiency of a power amplifier may be increased by reducing a fluctuation of instantaneous power using a single-carrier.

Ideally, when a receiver of a wireless communication system based on the DFTS-OFDM modulation scheme receives a signal through a radio channel without a frequency selective characteristic, the receiver may completely recover a transmitted symbol by a DFTS-OFDM demodulator.

However, when the symbol is transmitted at a high transmission rate, the modulated signal configured of a single-carrier has a wideband single-carrier characteristic, such that a signal may be widely spread on time domain. In this case, performance degradation may occur due to inter-symbol interference (ISI) by the frequency selective channel characteristic.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for transmitting an OFDM signal having advantages of reducing a signal distortion due to a channel having a frequency selective characteristic in a wireless communication system at the time of transmitting OFDM signal by applying DFTS.

An exemplary embodiment of the present invention provides a transmitting apparatus, including: a controller configured to determine a size of subchannels and a number of subchannels depending on a channel state with a receiving apparatus; and a DFT processor configured to spread a data symbol based on the size of subchannels and the number of subchannels.

The controller may determine the number of subchannels, and may determine the size of subchannels based on the number of subchannels.

The transmitting apparatus may further include a demultiplexer configured to divide the data symbol by the number of subchannels.

The controller may determine the size of subchannels so that the subchannels are all of the same size.

The controller may determine at least two sizes of subchannels.

The DFT processor may perform the discrete Fourier transform (DFT) to the data symbol in the consideration of the size of subchannels.

The controller may determine a portion where a channel characteristic deteriorates depending on the channel state, and may determine the channel band, while excluding the deteriorating portion from the channel band in which the data symbol is transmitted.

The transmitting apparatus may further include: an inverse fast Fourier transformer (IFFT) configured to perform inverse Fourier transform on the spread data symbol to generate an orthogonal frequency division multiplexing (OFDM) signal.

Another embodiment of the present invention provides a transmitting method, including: determining a size of subchannels and a number of subchannels depending on a channel state with a receiving apparatus; and spreading a data symbol by performing discrete Fourier transform (DFT) on the data symbol based on the number of subchannels.

The determining of the data symbol may include determining the number of subchannels, and determining the size of subchannels based on the number of subchannels.

The transmitting method may further include dividing the data symbol by the number of subchannels.

The determining may include determining the size of subchannels so that the subchannels are all of the same size.

The determining may include determining at least two sizes of subchannels.

The spreading may include performing the discrete Fourier transform (DFT) to the data symbol in the consideration of the size of subchannels.

The determining may further include determining a portion where a channel characteristic deteriorates depending on the channel state, and determining the channel band, while excluding the deteriorating portion from the channel band in which the data symbol is transmitted.

Yet another embodiment of the present invention provides a transmitting apparatus, including: at least one processor; a memory, and at least one program configured to be stored in the memory and run by the at least one processor, wherein the at least one program includes: an instruction determining a size of subchannels and a number of subchannels depending on a channel condition with a receiving apparatus; and an instruction spreading a data symbol by performing discrete Fourier transform (DFT) on the data symbol based on the size and the number of subchannels.

The instruction determining the size and the number of subchannels may further include an instruction determining at least two sizes of subchannels.

The instruction determining the size and the number of subchannels may further include an instruction determining the number of subchannels, and an instruction determining the size of subchannels based on the number of subchannels.

The instruction determining the size and the number of subchannels may include an instruction determining the size of subchannels so that the subchannels are all of the same size.

The instruction determining the size and the number of subchannels may further include an instruction determining a portion where a channel characteristic deteriorates depending on the channel state and determining the channel band, while excluding the deteriorating portion from the channel band in which the data symbol is transmitted.

DETAILED DESCRIPTION OF THE EMBODIMENTS

Figure 1:
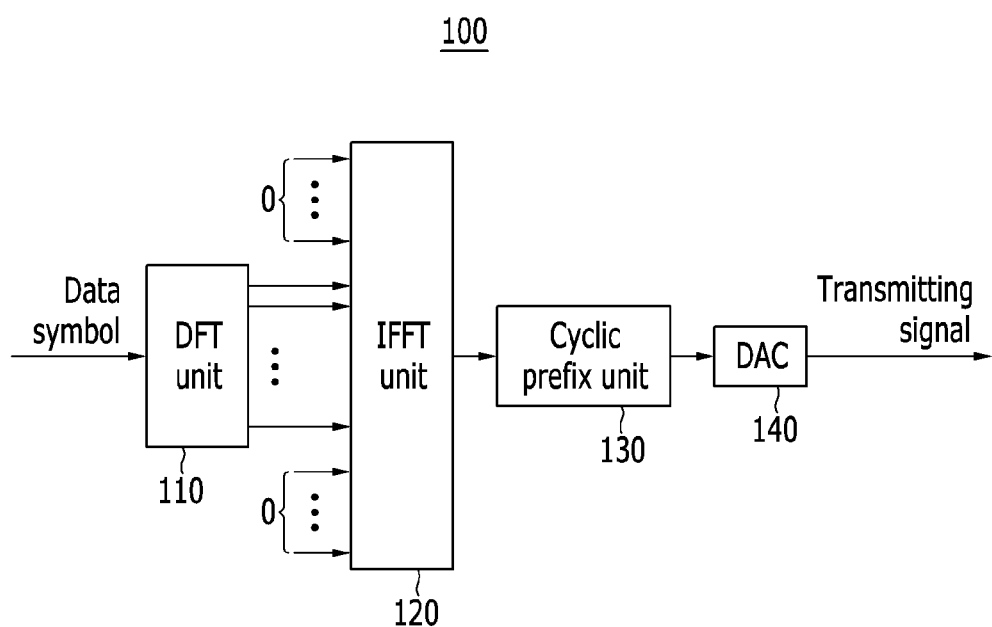
FIG. 1 is a block diagram illustrating a transmitter of a wireless communication system based on a DFTS-OFDM modulation scheme.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may be called a mobile station (MS), a mobile terminal (MT), an advanced mobile station (AMS), a high reliability mobile station (HR-MS), a subscriber station (SS), a portable subscriber station (PSS), an access terminal (AT), user equipment (UE), and the like and may also include all or some of the functions of the MT, the MS, the AMS, the HR-MS, the SS, the PSS, the AT, the UE, and the like Further, the base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (ARS) serving as a base station, a high reliability relay station (HR-RS) serving as a base station, small base stations (a femto base station (femoto BS), a home node B (HNB), a home eNodeB (HeNB), a pico base station (pico BS), a metro base station (metro BS), a micro base station (micro BS), and the like), and the like and may also include all or some of the functions of the ABS, the HR-BS, the node B, the eNodeB, the AP, the RAS, the BTS, the MMR-BS, the RS, the RN, the ARS, the HR-RS, the small base stations, and the like.

FIG. 1 is a block diagram illustrating a transmitter of a wireless communication system based on a DFTS-OFDM modulation scheme.

Referring to FIG. 1, the transmitter based on the DFTS-OFDM modulation scheme includes a DFT processor 110, an inverse fast Fourier transform (IFFT) processor 120, a cyclic prefix (CP) processor 130, and a digital to analog converter (DAC) 140.

Referring to FIG. 1, input data are spread as much as a channel bandwidth which is allocated through a M-point discrete Fourier transform (M-point DFT). In this case, a transformed signal by DFT has a single-carrier characteristic. The transmitter based on the DFTS-OFDM modulation scheme may map the generated signal to frequency resources and an OFDM modulated signal may be generated by the IFFT. Further, the OFDM modulated signal is added with a cyclic prefix (CP) at each symbol and may be digital to analog converted (DAC) and transmitted. Next, a receiver of a wireless communication system based on the DFTS-OFDM modulation scheme may receive and recover a transmitted symbol by a DFTS-OFDM demodulator FIG. 2 is a diagram illustrating a signal distortion depending on channel characteristics of a wireless system based on the DFTS-OFDM modulation scheme.

Figure 2:
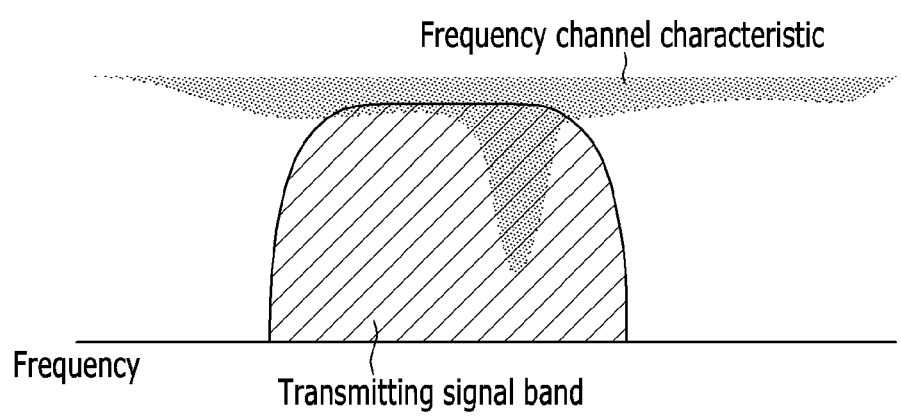
FIG. 2 is a diagram illustrating a signal distortion depending on channel characteristics of a wireless system based on the DFTS-OFDM modulation scheme.

Referring to FIG. 2, a communication channel 200 shows a frequency selective characteristic in the frequency band range of the M-point DFT. In this case, the receiver may not accurately recover a symbol from a received signal by inverse discrete Fourier transform (IDFT).

Further, when data are transmitted at a high data rate, a modulated signal having a high modulation index is allocated to a wide bandwidth channel (In case of wideband single-carrier transmission), and therefore the frequency selective characteristic may be easy to occur in a wireless communication channel. Therefore, in the case of the DFTS-OFDM, to compensate for the radio channel with frequency selective characteristics, a high performance equalizer for a channel equalization is required. That is, the DFTS-OFDM demodulator needs to use a channel equalization technique with high complexity, and the like, in order to recover a signal from a received data at a high rate. As an example of a high-performance equalizer, there are a minimum mean square error (MMSE) equalizer of a time domain, a frequency domain equalizer to reduce complexity, a decision feedback equalizer, and the like.

However, these kinds of equalizers require high complexity due to a calculation to obtain an inverse matrix of a cross correlation vector depending on a channel impulse response and a calculation to determine filter taps in the time domain also requires high complexity. That is, the OFDM modulation scheme has a disadvantage in that the fluctuation of an instantaneous power may be larger by transmitting data in a multi-carrier and the DFTS-OFDM modulation scheme has an advantage in that the fluctuation of an instantaneous power may be reduced by transmitting data in a single-carrier so as to increase efficiency of a power amplifier. However, the DFTS-OFDM has a disadvantage in that it needs to use the equalizer having high complexity due to the frequency selective channel characteristic, otherwise its performance may be worse than that of the OFDM modulation.

Figure 3:
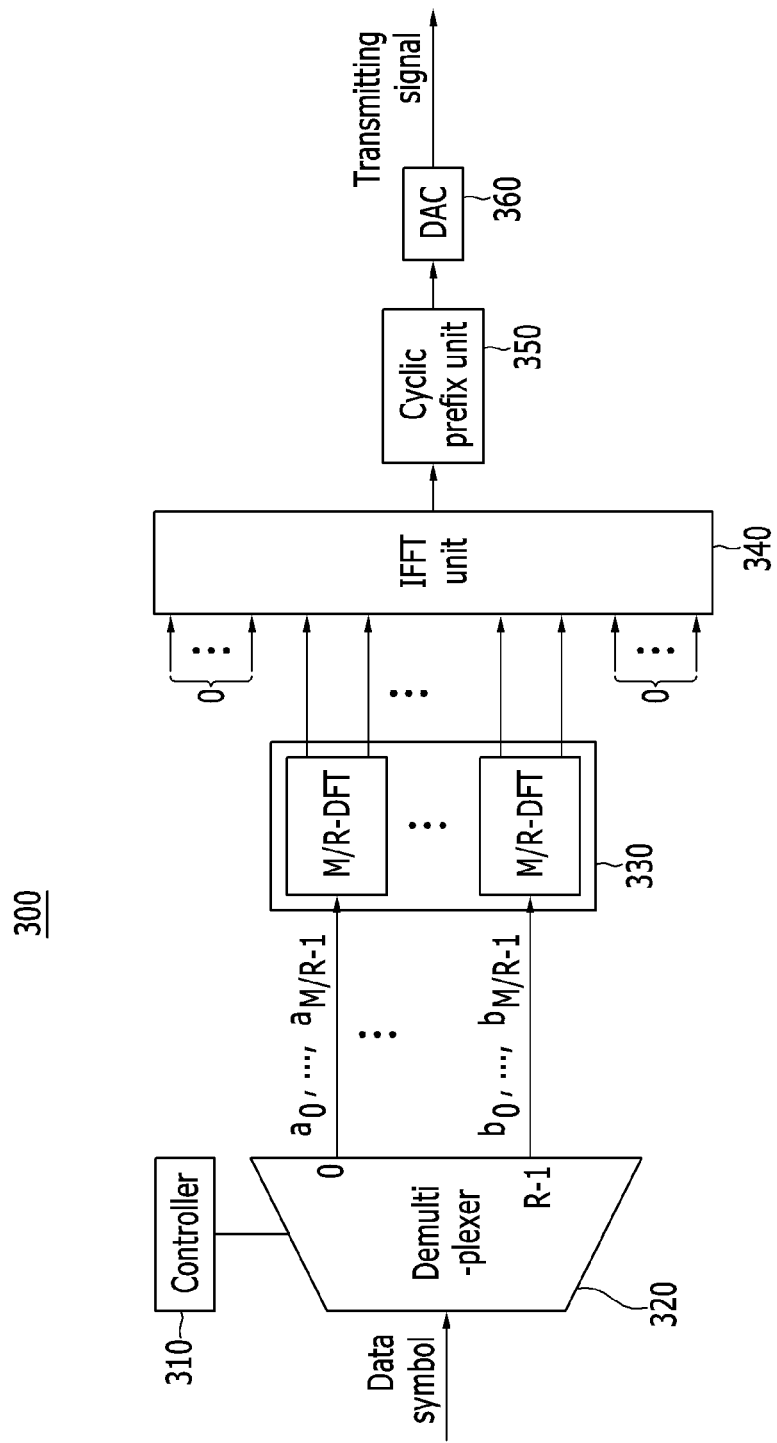
FIG. 3 is a diagram illustrating a transmitting apparatus based on a DFTS-OFDM scheme according to an exemplary embodiment of the present invention.

FIG. 3 is a diagram illustrating a transmitting apparatus based on a DFTS-OFDM scheme according to an exemplary embodiment of the present invention.

A controller of a DFTS-OFDM transmitting apparatus according to an exemplary embodiment of the present invention may determine a structure of subchannels in a channel bandwidth in which signals are transmitted according to a channel state report received from a terminal. For example, the controller may identify the portion that has poor channel conditions, and determine a size and a number of subchannels to mitigate influence on the poor channels in accordance with the channel state report. Further, the controller may determine methods of deployment of subchannels in the entire channel band.

In other words, the controller according to an exemplary embodiment of the present invention may divide the signal band into a plurality of subchannels, multiple DFT processors of the DFTS-OFDM transmitting apparatus according to an exemplary embodiment of the present invention may perform DFT operations to the data symbol allocated to each subchannel.

Meanwhile, a demultiplexer of the DFTS-OFDM transmitting apparatus according to an exemplary embodiment of the present invention may also serve the functions of the controller (determining a structure of the subchannels). That is, the functions of the controller of the DFTS-OFDM transmitting apparatus may be performed by a processor different from the processor performing the function of the demultiplexer, or may be performed by the same processor of the demultiplexer. The DFTS-OFDM transmitting apparatus according to the exemplary embodiment of the present invention may be a base station or may be a terminal.

Referring to FIG. 3, a transmitting apparatus 300 according to the exemplary embodiment of the present invention includes a controller 310, a demultiplexer 320, a DFT processor 330, an IFFT processor 340, a cyclic prefix processor 350, and a DAC 360.

Referring to FIG. 3, the controller 310 may determine a size of the subchannel, so that the size of subchannels are all the same.

In this case, according to the exemplary embodiment of the present invention, when the size of entire channel band to be M, the number of subchannels R may be a factor of the M, which is larger than 1. When the R is 1, it is the same as the OFDM modulation scheme and when the R is M, it is the same as the DFTS-OFDM modulation scheme. In this case, a size of M/R may be selected to increase efficiency of the implementation for a DFT processor.

Next, the demultiplexer 320 may divide equally the input data symbol by M/R.

The DFT processor 330 may perform the M/R-point DFTs having the size of M/R on the equally divided data symbol to spread the data symbol into the frequency domain. Next, the DFT processor 330 may map the spread data symbol to the subchannels.

Figure 7:
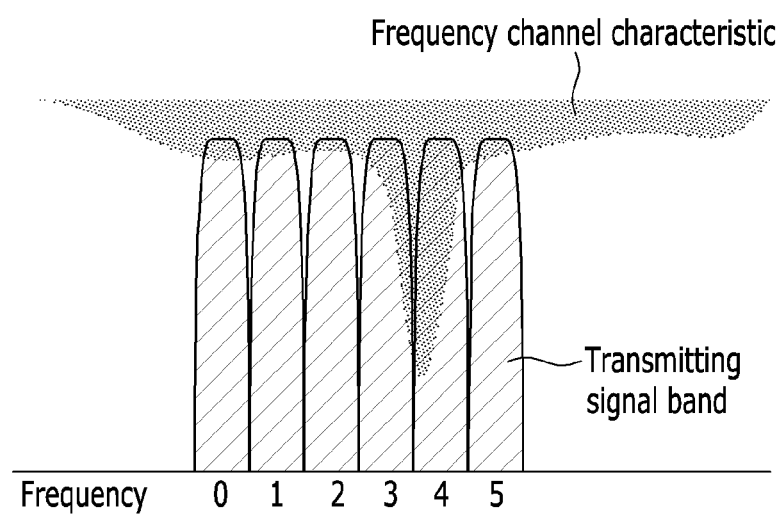
FIG. 7 is a diagram illustrating a signal transmitted from the transmitting apparatus based on the DFTS-OFDM scheme according to the exemplary embodiment of the present invention.

Next, the IFFT processor 340 performs the inverse Fourier transform on the data symbol mapped to the subchannels to generate the OFDM modulated signals in the time domain. Next, the cyclic prefix processor 350 attaches CP to the OFDM modulated signal in the time domain, in which the CP attached OFDM signal may be converted into analog signal by the DAC and transmitted. The transmitting apparatus based on the DFTS-OFDM scheme according to the exemplary embodiment of the present invention illustrated in FIG. 3 may transmit the signal as illustrated in FIG. 7.

Figure 4:
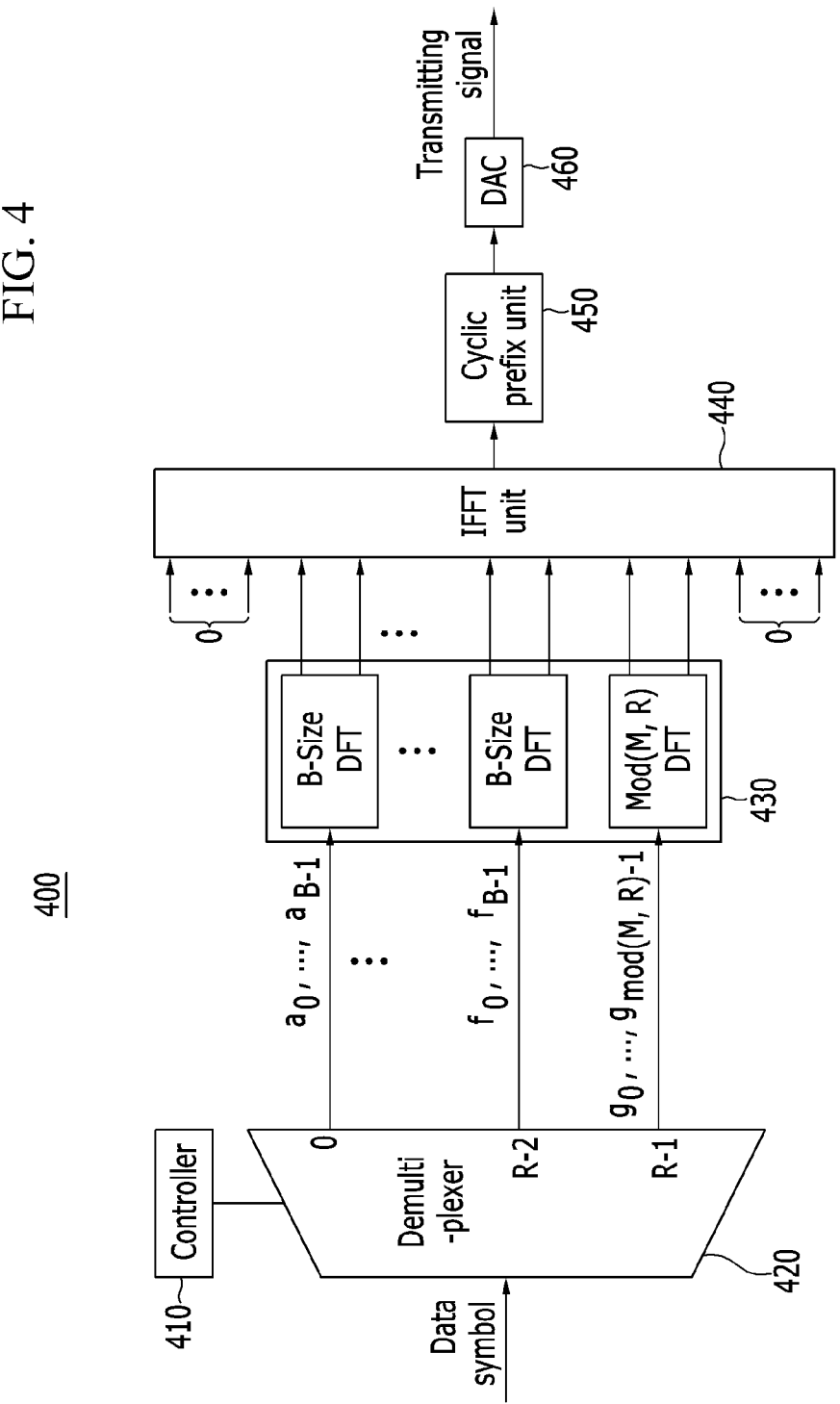
FIG. 4 is a diagram illustrating a transmitting apparatus based on a DFTS-OFDM scheme according to another exemplary embodiment of the present invention.

FIG. 4 is a diagram illustrating a transmitting apparatus based on a DFTS-OFDM scheme according to another exemplary embodiment of the present invention.

Referring to FIG. 4, a transmitting apparatus 400 according to the exemplary embodiment of the present invention includes a controller 410, a demultiplexer 420, a DFT processor 430, an IFFT processor 440, a cyclic prefix processor 450, and a DAC 460.

Referring to FIG. 4, the controller 410 may determine the subchannels to be different sizes. That is, the sizes of the subchannels are different from each other. In this case, when the number of the subchannels R are not a factor of M of the entire channel band, the controller 410 may determine the size B of the subchannel before determining the number of subchannels. Next, the controller 410 may determine the number of subchannels according to the pre-determined size B. The size B may be determined as an integer between 1 and M, and may be determined in the consideration of DFT efficiency. In the exemplary embodiment of the present invention, the number of subchannels R may be determined by a ceiling function of M/B (R=ceil (M/B)) after the size B is determined.

In this case, in the number of subchannels of R, R−1 subchannels may have the size B, while remaining subchannel may have the size determined by a mod function (mod (M, B)).

Figure 8:
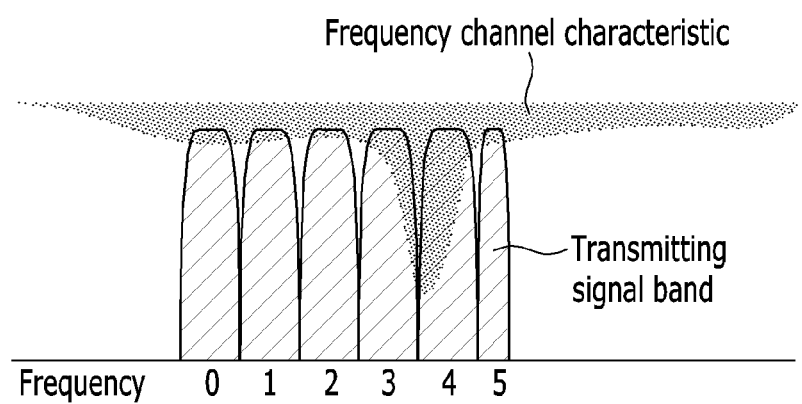
FIG. 8 is a diagram illustrating a signal transmitted from the transmitting apparatus based on the DFTS-OFDM scheme according to the another exemplary embodiment of the present invention.

The transmitting apparatus based on the DFTS-OFDM scheme according to the exemplary embodiment of the present invention illustrated in FIG. 4 may transmit the signal as illustrated in FIG. 8.

Figure 5:
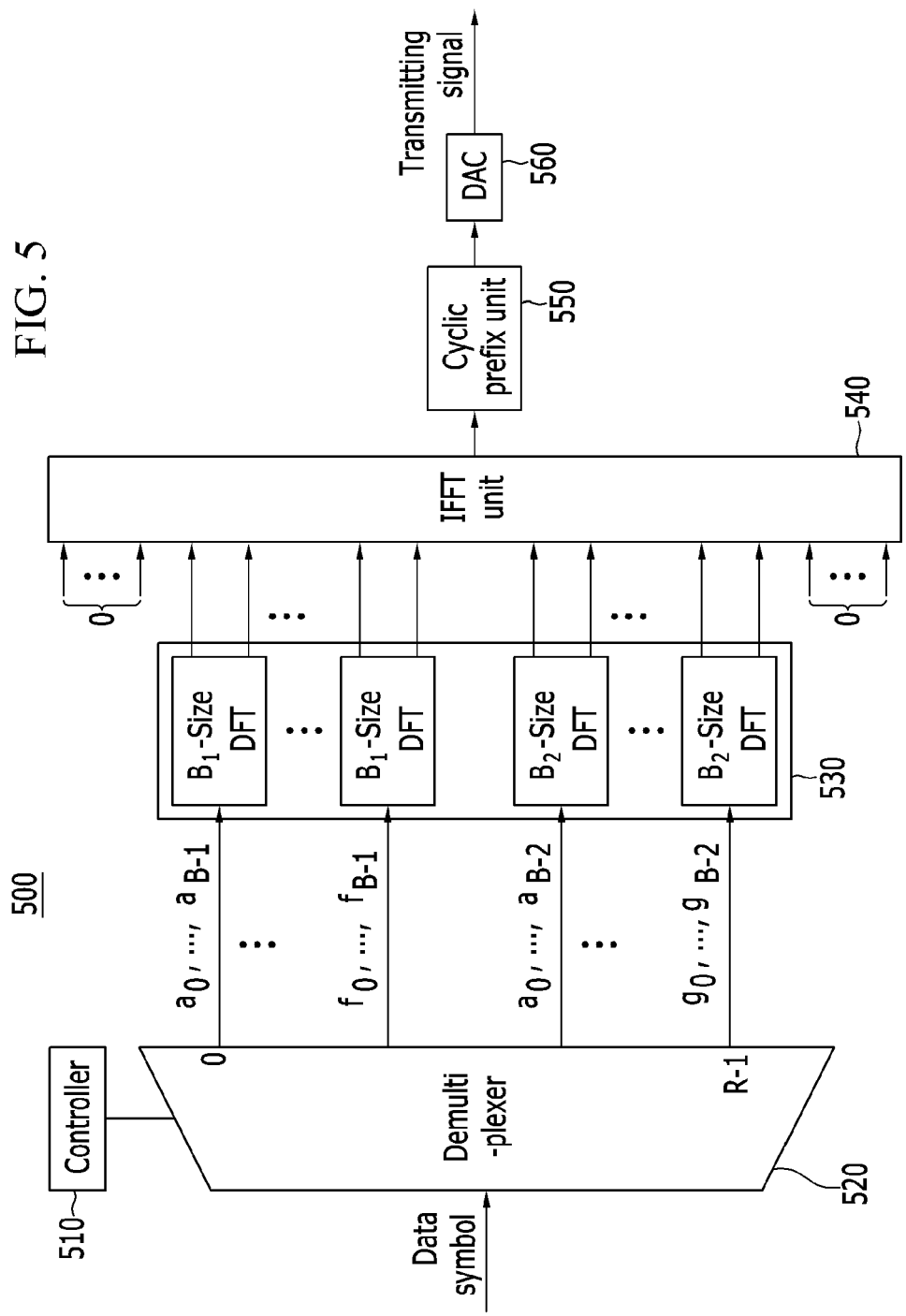
FIG. 5 is a diagram illustrating a transmitting apparatus based on a DFTS-OFDM scheme according to another exemplary embodiment of the present invention.

FIG. 5 is a block diagram illustrating a transmitting apparatus based on a DFTS-OFDM scheme according to another exemplary embodiment of the present invention.

Referring to FIG. 5, a transmitting apparatus 500 according to another exemplary embodiment of the present invention includes a controller 510, a demultiplexer 520, a DFT processor 530, an IFFT processor 540, a cyclic prefix processor 550, and a DAC 560.

In the transmitting apparatus 500 according to another exemplary embodiment of the present invention, the controller 510 may divide the entire channel band into a plurality of groups, and a size of the subchannels may be decided differently into groups. In this case, the size of subchannels in each groups are all the same. For example, the controller 510 divides the entire channel band into two channel band parts, the first part may have the size of $M_1$ and the second part may have the size of $M_2$. The first part of the channel band may include at least one subchannel with size B1, and the second part of the channel band may include at least one subchannel with size $B_2$. In this case, the number of subchannels $R_1$ of the first channel band part may be determined by a ceiling function of $M_1/B_1$ (ceil $(M_1/B_1)$), and the number of subchannels $R_2$ of the second channel band part may be determined by a ceiling function of $M_2/B_2$ (ceil $(M_2/B_2)$). The total number of entire subchannels R may be $R_{1+}R_2$.

Figure 9:
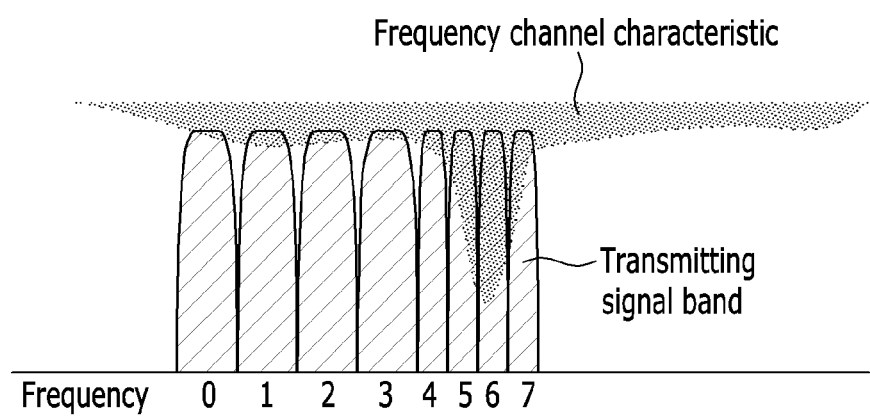
FIG. 9 is a diagram illustrating a signal transmitted from the transmitting apparatus based on the DFTS-OFDM scheme according to the another exemplary embodiment of the present invention.

The transmitting apparatus based on the DFTS-OFDM scheme according to the exemplary embodiment of the present invention illustrated in FIG. 5 may transmit the signal as illustrated in FIG. 9.

Figure 6:
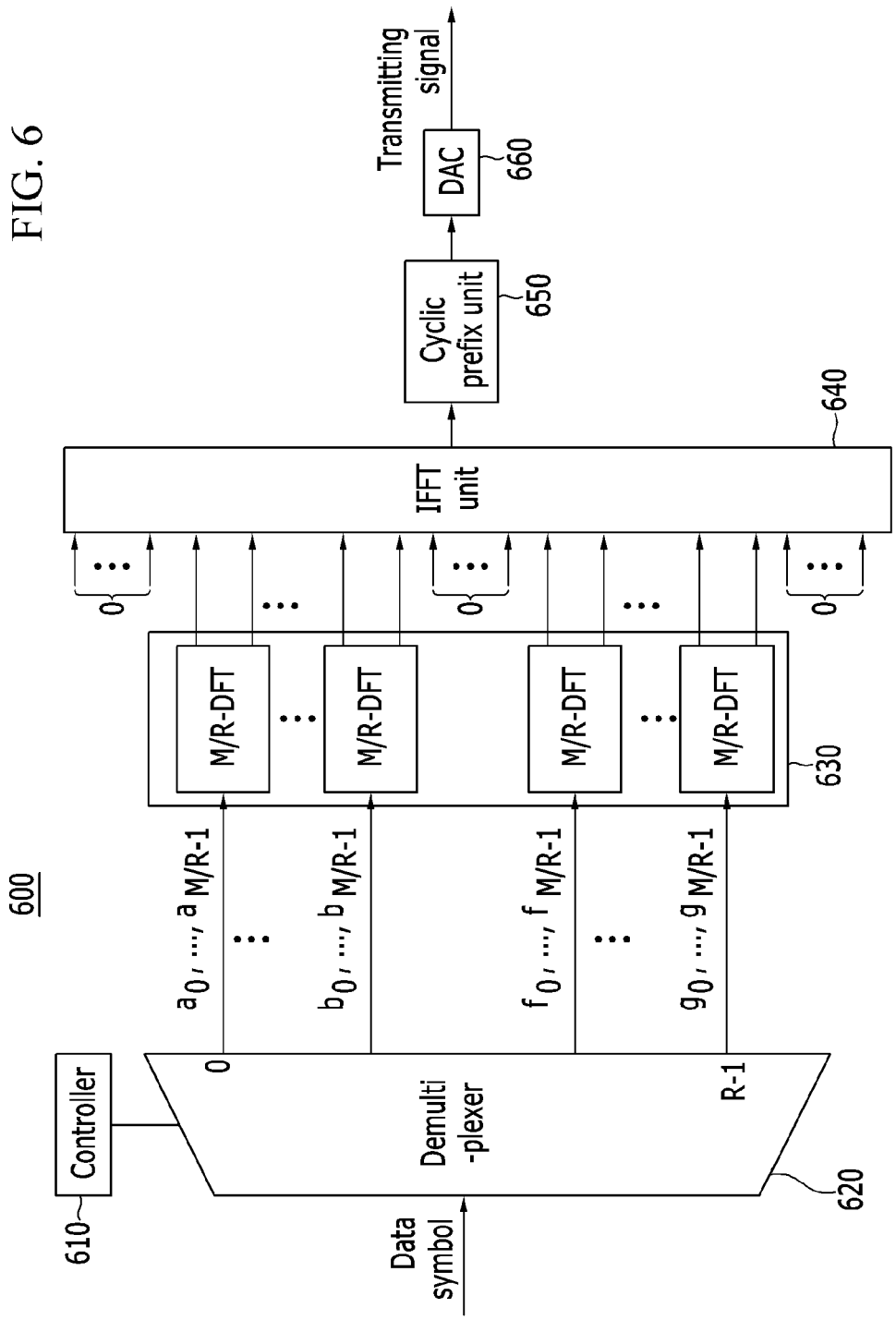
FIG. 6 is a diagram illustrating a transmitting apparatus based on a DFTS-OFDM scheme according to another exemplary embodiment of the present invention.

FIG. 6 is a diagram illustrating a transmitting apparatus based on a DFTS-OFDM scheme according to another exemplary embodiment of the present invention.

Referring to FIG. 6, the transmitting apparatus 600 according to another exemplary embodiment of the present invention includes a controller 610, a demultiplexer 620, a DFT processor 630, an IFFT processor 640, a cyclic prefix processor 650, and a DAC 660.

Referring to FIG. 6, the transmitting apparatus 600 according to another exemplary embodiment of the present invention may figure out status of the channel where a frequency channel characteristic deteriorates based on the channel state information received from the terminal and may allocate the subchannels avoiding deteriorated frequency portions in the channel band. The DFTS-OFDM transmitting apparatus 600 illustrated in FIG. 6 may be used to avoid interference of a specific frequency bandwidth, and may mitigate an influence of the channel state by not allocating data to the frequency portions in which the frequency channel characteristic deteriorates or by adjusting the size of the subchannels.

Figure 10:
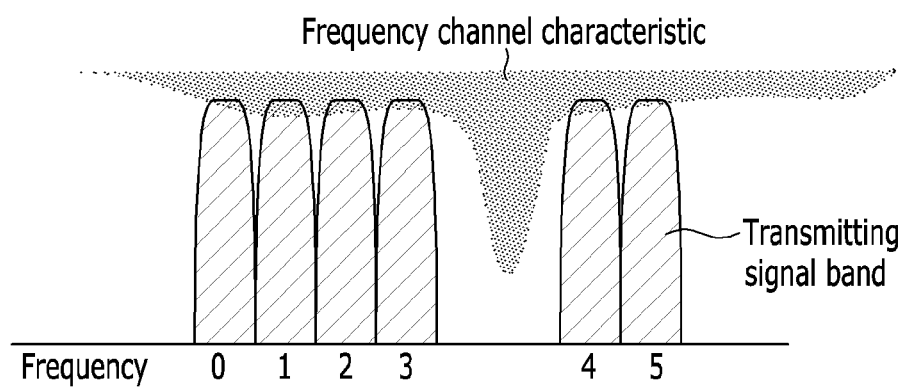
FIG. 10 and FIG. 11 are diagrams illustrating a signal transmitted from the transmitting apparatus based on the DFTS-OFDM scheme according to the another exemplary embodiment of the present invention.
Figure 11:
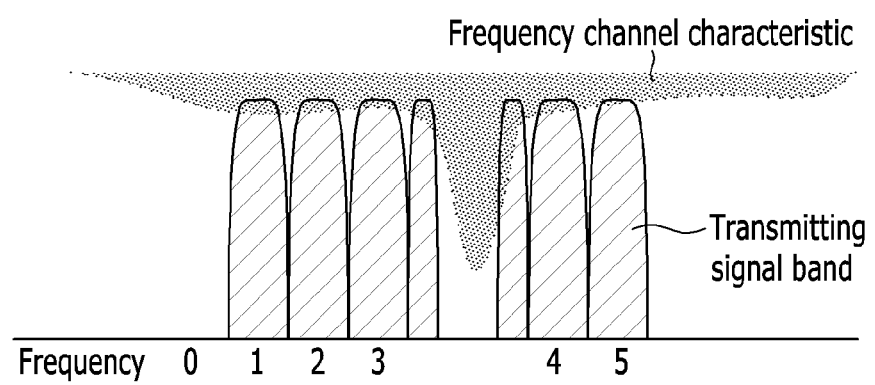

The DFT processor 630 may perform the M/R-point DFT on the equally divided data symbol as the DFT processor 330 illustrated in FIG. 3. When the DFT processor 630 applies the features of the DFT processor 430 illustrated in FIG. 4 or the DFT processor illustrated in FIG. 5, it may determine the size of the subchannels to be different, or may determine the size of the subchannel that is divided into parts of the channel band. The DFT processor 630 applying the features of the DFT processor 330 illustrated in FIG. 3 may transmit the signal as illustrated in FIG. 10. The DFT processor 630 applying the features of the DFT processor 430 illustrated in FIG. 4 may transmit the signal as illustrated in FIG. 11.

In FIG. 6, the controller 610 may deploy the subchannels with dispersed structure to avoid the channel distortions. For example, in FIG. 10 and FIG. 11 the two parts of the subchannels are separated into different frequency regions. The controller 610 illustrated in FIG. 6, may avoid an influence of signal distortion by dispersing the subchannels and by not using the frequency regions distorted. As a result, the two channel band parts dispersed by the controller 610 in the entire channel band are separated with a predetermined interval therebetween.

FIG. 7 is a diagram illustrating a signal transmitted from the transmitting apparatus based on the DFTS-OFDM scheme according to the exemplary embodiment of the present invention.

In FIG. 7, the signal transmitted from the transmitting apparatus 300 illustrated in FIG. 3 is illustrated. Referring to FIG. 7, the transmitted signals in the third subchannel and the fourth subchannel is deteriorated because of the frequency selective channel characteristic. However the transmitted signals in other subchannels may be recovered by a relatively simple equalizer because of the frequency non-selective channel characteristic. In this case, the transmitted signals in the third and the fourth subchannel which are degraded may be also recovered through forward error corrections (FEC) and/or frequency diversity characteristics.

FIG. 8 is a diagram illustrating a signal transmitted from the transmitting apparatus based on the DFTS-OFDM scheme according to the exemplary embodiment of the present invention.

In FIG. 8, the signal transmitted from the transmitting apparatus 800 illustrated in FIG. 4 is illustrated.

FIG. 9 is a diagram illustrating a signal transmitted from the transmitting apparatus based on the DFTS-OFDM scheme according to the exemplary embodiment of the present invention.

In FIG. 9, the signal transmitted from the transmitting apparatus 300 illustrated in FIG. 5 is illustrated.

FIG. 10 and FIG. 11 are diagrams illustrating a signal transmitted from the transmitting apparatus based on the DFTS-OFDM scheme according to the exemplary embodiment of the present invention.

In FIG. 10 and FIG. 11, the signal transmitted from the transmitting apparatus 600 illustrated in FIG. 6 is illustrated.

Meanwhile, a method of subchannel mapping can be classified into two types: localized mapping and a distributed mapping depending on the scheme of allocating the subchannels to the channel bandwidth. FIG. 3, FIG. 4 and FIG. 5 are diagrams illustrating transmitting apparatuses performing the localized mapping, and FIG. 6 is a diagram illustrating a transmitting apparatus performing the distributed mapping. FIG. 7, FIG. 8 and FIG. 9 are diagrams illustrating signals transmitted from the transmitting apparatus using the localized mapping, and FIG. 10 and FIG. 11 are diagrams illustrating signals transmitted from the transmitting apparatus using the distributed mapping.

Figure 12:
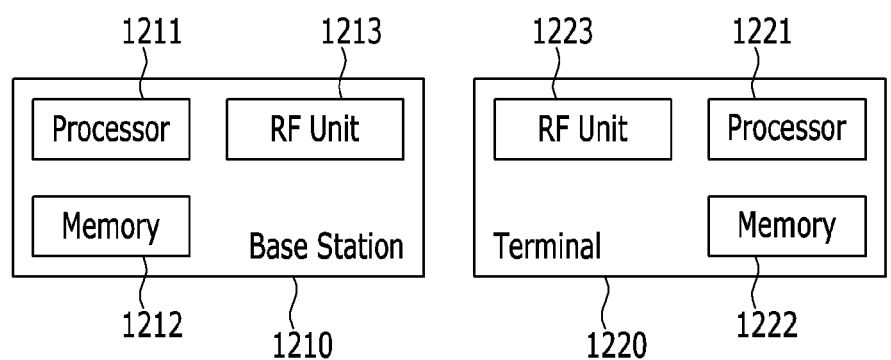
FIG. 12 is a block diagram illustrating a wireless communication system according to an exemplary embodiment of the present invention.

FIG. 12 is a block diagram illustrating a wireless communication system according to an exemplary embodiment of the present invention.

Referring to FIG. 12, the wireless communication system according to the exemplary embodiment of the present invention may include a base station (BS) 1210, and at least one terminal 1220 included in coverage of the base station 1210.

The base station 1210 may include a processor 1211, a memory 1212 and an RF (radio frequency) unit 1213. The memory 1212 is connected with the processor 1211 and then stores various kinds of information to drive the processor 1211. The RF unit 1213 is connected with the processor 1211 and then transmits and/or receives radio signals. The processor 1211 implements the proposed functions, processes and/or methods. Layers of a radio interface protocol can be implemented by the processor 1211. The function of the base station 1210 may be implemented by the processor 1211.

The terminal 1220 may include a processor 1221, a memory 1222 and an RF (radio frequency) unit 1223. The memory 1222 is connected with the processor 1221 and then stores various kinds of information to drive the processor 1221. The RF unit 1223 is connected with the processor 1221 and then transmits and/or receives radio signals. The processor 1221 implements the proposed functions, processes and/or methods. Layers of a radio interface protocol can be implemented by the processor 1221. The function of the terminal 1220 may be implemented by the processor 1211.

The memory 1212/1222 may be provided inside or outside the processor 1211/1221. And, the memory 1212/1222 may be connected with the processor 1211/1221 via various kinds of well-known means. The memory 1212/1222 may include various forms of volatile or non-volatile storage media. For example, the memory 1212/1222 may include a read-only memory (ROM) and a random access memory (RAM)

As described above, according to the exemplary embodiment of the present invention, it is possible to perform the DFT for each subchannel by adaptively dividing the channel bandwidth into the plurality of subchannels depending on the channel condition. That is, it is possible to actively cope with the frequency selective characteristic of the channel by controlling the signal bandwidth and the fluctuation of the instantaneous power depending on the channel condition.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A transmitting apparatus, comprising:
   a controller configured to determine a structure of subchannels in a channel bandwidth in which signals are transmitted by the transmitting apparatus, wherein the structure comprises a number of subchannels and a size of each of the subchannels, and wherein the structure is determined based on a size of entire channel band; and
   a DFT processor configured to spread a data symbol based on the structure of the subchannels.

2. The transmitting apparatus of claim 1, wherein the controller determines the number of the subchannels, and determines the size of the subchannels by dividing the size of the entire channel band by the number of the subchannels.

3. The transmitting apparatus of claim 1, wherein the controller determines the size of the subchannels, and determines, the number of the subchannels.

4. The transmitting apparatus of claim 1, wherein the controller divides the entire channel band into at least two channel band parts, determines the size of the subchannels corresponding to the at least two channel band parts respectively, and determines the number of the subchannels by dividing the size of each channel band part by the size of the subchannels.

5. The transmitting apparatus of claim 4, wherein the at least two channel band parts include a first channel band part and a second band part with a predetermined interval therebetween.

6. The transmitting apparatus of claim 4, wherein the at least two channel band parts include a first channel band part and a second band part, and the size of the subchannels in the first channel band part and the size of the subchannels in the second channel band part are different from each other.

7. The transmitting apparatus of claim 4, wherein the DFT processor includes a first DFT processor configured to perform Discrete Fourier Transform (DST) in consideration of a first size of a first subchannel corresponding to a first channel band part of the at least two channel band parts, and a second DFT processor configured to perform DFT in consideration of a second size of a second subchannel corresponding to a second channel band part of the at least two channel band parts.

8. The transmitting apparatus of claim 1, further comprising a demultiplexer configured to divide the data symbol by the number of the subchannels.

9. A transmitting method, comprising:
    determining a structure of subchannels in a channel bandwidth in which signals are transmitted by the transmitting apparatus, where the structure comprises a number of subchannels and a size of each of the subchannels, and wherein the determining of the structure is based on a size of entire channel band; and
    spreading a data symbol by performing discrete Fourier transform (DFT) based on the structure of the subchannels.

10. The transmitting method of claim 9, wherein the determining includes determining the number of the subchannels, and determining the size of the subchannels by the number of the subchannels.

11. The transmitting method of claim 9, wherein the determining includes determining the size of the subchannels, and determining the number of the subchannels by dividing the size of the entire channel band by the size of the subchannels.

12. The transmitting method of claim 9, wherein the determining includes dividing the entire channel band into at least two channel band parts, determining the size of the subchannels corresponding to the at least two channel band parts, respectively, and determining the number of the subchannels by dividing the size of each channel band parts by the size of the subchannels.

13. The transmitting method of claim 9, wherein at least two channel band parts include a first channel band part and a second channel band part with a predetermined interval therebetween.

14. The transmitting apparatus of claim 12, wherein the dividing includes performing DFT in consideration of a first size of a first subchannel corresponding to a first channel band part of the at least two channel band parts, and performing DFT in consideration of a second size of a second subchannel corresponding to a second channel band part of the at least two channel band parts.

15. The transmitting method of claim 12, wherein the at least two channel band parts include a first channel band part and a second channel band part, and the size of the subchannels in the first channel band part and the size of the subchannels in the second channel band part are different from each other.

16. The transmitting method of claim 15, further comprising dividing the data symbol by the number of subchannels.

17. A transmitting apparatus 15, comprising:
    at least one processor;
    a memory, and
    a radio frequency (RF) unit,
    wherein the at least one processor is configured to perform at least one step by executing at least one program stored in the memory,
    wherein the at least one includes:
    determining a structure of subchannels in a channel bandwidth in which signals are transmitted by the transmitting apparatus, wherein the structure comprises a number of subchannels and a size of each of the subchannels, and wherein the structure is determined based on a size of entire channel band; and
    spreading a data symbol by performing discrete Fourier transform (DFT) on the data symbol based on the structure of the subchannels.

18. The transmitting apparatus of claim 17, wherein the determining includes dividing the entire channel band into at least two channel band parts, determining the size the subchannels corresponding to the at least two channel band parts respectively, and determining the number of the subchannels by dividing the size of the at least two channel band parts by size of each of the subchannels.

19. The transmitting apparatus of claim 18, wherein the at least two channel band parts include a first channel band part and a second channel band part with a predetermined interval therebetween.

20. The transmitting apparatus of claim 18, wherein the dividing includes performing DFT in consideration of a first size of a first subchannel corresponding to a first channel band part of the at least two channel band parts, and performing DFT in consideration of a second size of a second subchannel corresponding to a second channel band part of the at least two channel band parts.

* * * * *